(12) United States Patent
Tuovinen et al.

(10) Patent No.: US 11,376,743 B2
(45) Date of Patent: Jul. 5, 2022

(54) SYSTEMS AND METHODS FOR PROVIDING REMOTE TOUCH

(71) Applicant: JoyHaptics Oy, Helsinki (FI)

(72) Inventors: Jussi Tuovinen, Espoo (FI); Kai Martesuo, Espoo (FI)

(73) Assignee: JoyHaptics Oy, Helsinki (FI)

( * ) Notice: Subject to any disclaimer, the term of this patent is extended or adjusted under 35 U.S.C. 154(b) by 521 days.

(21) Appl. No.: 16/375,262

(22) Filed: Apr. 4, 2019

(65) Prior Publication Data

US 2020/0316784 A1 Oct. 8, 2020

(51) Int. Cl.
*B25J 11/00* (2006.01)
*G08B 6/00* (2006.01)
*B25J 9/16* (2006.01)
*B25J 13/00* (2006.01)
*G06F 3/01* (2006.01)

(52) U.S. Cl.
CPC ............ *B25J 11/003* (2013.01); *B25J 9/1635* (2013.01); *B25J 9/1664* (2013.01); *B25J 13/006* (2013.01); *G06F 3/016* (2013.01); *G08B 6/00* (2013.01)

(58) Field of Classification Search
USPC .................................. 700/245–264
See application file for complete search history.

(56) References Cited

U.S. PATENT DOCUMENTS

| 6,773,344 | B1 * | 8/2004 | Gabai | A63H 30/04 463/1 |
| 8,135,128 | B2 * | 3/2012 | Marti | H04M 19/04 379/372 |
| 9,594,502 | B2 * | 3/2017 | Lee | G08C 17/02 |
| 9,712,359 | B2 * | 7/2017 | Snyder | G08B 21/0202 |
| 10,001,837 | B2 * | 6/2018 | Anderson | G06F 3/013 |
| 10,176,725 | B2 * | 1/2019 | Fischer | G09B 19/00 |
| 10,391,636 | B2 * | 8/2019 | Breazeal | B25J 9/0003 |
| 10,405,745 | B2 * | 9/2019 | Gnana | G08B 21/0476 |
| 10,836,041 | B2 * | 11/2020 | Ichikawa | G10L 15/22 |
| 11,093,449 | B2 * | 8/2021 | Bastian | G06F 3/016 |
| 2006/0064202 | A1 * | 3/2006 | Gutmann | G05D 1/0251 700/245 |

(Continued)

FOREIGN PATENT DOCUMENTS

| WO | WO-0109863 | A1 * | 2/2001 | .............. G06F 3/011 |
| WO | WO-2004053671 | A1 * | 6/2004 | .............. H04L 67/34 |
| WO | WO-2010093995 | A1 * | 8/2010 | .......... G06Q 10/107 |

*Primary Examiner* — Jonathan L Sample
(74) *Attorney, Agent, or Firm* — Ziegler IP Law Group, LLC

(57) ABSTRACT

A system for providing remote touch of a first person to a second person. The system comprises first device, haptic terminal and communication network. The first device, associated with the first person, comprises a first touch sensor for capturing data related to sliding movement of pointer along first touch sensor, and communication means for sending the captured data to haptic terminal using communication network. The haptic terminal, associated with the second person, comprises receiving means for receiving the captured data, processing unit to form a control signal by using the received captured data, and touch replicator for replicating touch based on control signal, wherein the replicated touch is a caress. Disclosed further is a method for providing remote touch using the aforementioned system.

15 Claims, 6 Drawing Sheets

(56) References Cited

U.S. PATENT DOCUMENTS

| | | | |
|---|---|---|---|
| 2008/0134801 A1* | 6/2008 | Tseng | B25J 13/02 73/862.041 |
| 2008/0274769 A1* | 11/2008 | Linden | H04W 4/16 455/566 |
| 2009/0055019 A1* | 2/2009 | Stiehl | B25J 9/1671 901/17 |
| 2013/0123987 A1* | 5/2013 | Kase | B25J 9/1697 901/47 |
| 2014/0035736 A1* | 2/2014 | Weddle | G06F 3/016 340/407.2 |
| 2014/0143682 A1* | 5/2014 | Druck | G06F 3/016 715/752 |
| 2014/0371912 A1* | 12/2014 | Passot | G06N 3/049 700/264 |
| 2014/0371954 A1* | 12/2014 | Lee | G08C 17/02 701/2 |
| 2015/0022328 A1* | 1/2015 | Choudhury | G06F 1/163 340/12.5 |
| 2015/0190925 A1* | 7/2015 | Hoffman | B25J 9/1689 901/47 |
| 2017/0193767 A1* | 7/2017 | Foxlin | G08B 6/00 |
| 2017/0203221 A1* | 7/2017 | Goslin | G10L 21/003 |
| 2017/0269607 A1* | 9/2017 | Fulop | B25J 13/025 |
| 2017/0282375 A1* | 10/2017 | Erhart | B25J 19/023 |
| 2017/0310517 A1* | 10/2017 | Snyder | G08B 21/0202 |
| 2018/0262894 A1* | 9/2018 | Daoura | H04W 4/80 |
| 2019/0143528 A1* | 5/2019 | Hayashi | B25J 19/02 700/245 |

\* cited by examiner

SYSTEMS AND METHODS FOR PROVIDING REMOTE TOUCH

TECHNICAL FIELD

The present disclosure relates generally to remote communication, and more specifically to systems and methods for providing remote touch of first person to second person.

BACKGROUND

Humans have a fundamental need to be connected to other humans. Owing to various reasons, a large fraction of people is not able to be together as much as they would like, subsequently missing each other. For example, couples, friends, parents-children and grandparents-grandchildren, either due to personal or professional reasons have to stay apart from each other, which subsequently increases loneliness and associated mental and physical discomforts. Although, digital communication has played a significant role in fundamentally connecting remote people through audio and/or video-based communication means. However, the audio and/or video-based means of communication fail to satisfy an emotional part of the communication. For instance, the fundamental psychological and social needs of human are often assisted by a physical touch, which is missing from our present digital communication mode.

In the past decade, a concept of remote touch (or computer-mediated social touch or remote hug) has been extensively studied, and remote touch systems have been devised to enable presence of some sort of emotional connect and/or feeling over a distance. Typically, such remote touch systems include remote devices, which are communicably coupled to each other using a communication network, and at least one device among such devices is designed to replicate or produce a body movement to generate a feeling of touch. However, such remote touch systems suffer from various shortcomings, for example such systems fail to simulate desired feeling or sensation of touch. In other words, the remote touch provided by such systems fail to create similar feelings as provided by a real touch. Further, as the remote devices are communicably coupled to each other using the communication network, therefore any problem in the communication network, like break in communication network or poor signal strength may deteriorate user's experience subjected to the feeling of remote touch.

Therefore, in light of the foregoing discussion, there exists a need to overcome the aforementioned drawbacks associated with conventional remote touch systems.

SUMMARY

The present disclosure seeks to provide a system for providing remote touch of a first person to a second person. The present disclosure also seeks to provide a method for providing remote touch of a first person to a second person using the aforementioned system. The present disclosure seeks to provide a solution to the existing problem of lack of real feeling or sensation in a remote touch, and poor user experience due to communication network issues.

An aim of the present disclosure is to provide a solution that overcomes at least partially the problems encountered in prior art, and to provide effective generation of real feeling or sensation in a remote touch, along with communication network issues.

In one aspect, an embodiment of the present disclosure provides a system for providing remote touch of a first person to a second person, the system comprising a first device, a haptic terminal and a communication network, wherein the first device is associated with the first person, the first device comprises a first touch sensor configured to capture data related to a sliding movement of a pointer along the first touch sensor;

communication means for sending the captured data to the haptic terminal using the communication network;

the haptic terminal is associated with the second person, the haptic terminal comprises receiving means for receiving the captured data;

a processing unit configured to use the received captured data to form a control signal;

a touch replicator configured to replicate touch based on the control signal, wherein the replicated touch is a caress.

In another aspect, an embodiment of the present disclosure provides a method for providing remote touch of a first person to a second person, wherein the first person is associated with a first device and the second person is associated with a haptic terminal communicably coupled to the first device by a communication network, the method comprising capturing data related to a sliding movement of a pointer along a first touch sensor of the first device;

sending the captured data by communication means of the first device using the communication network;

receiving the captured data by receiving means of the haptic terminal;

forming a control signal, using the received captured data, by a processing unit of the haptic terminal; and replicating touch based on the control signal by a touch replicator of the haptic terminal, wherein the replicated touch is a caress.

Embodiments of the present disclosure substantially eliminate or at least partially address the aforementioned problems in the prior art, and enable the disclosed system to generate real feeling or sensation in a remote touch by efficiently managing speed, pressure and a contact area of a moving component responsible to provide the remote touch. The disclosed system is also operable to be trained to learn touch patterns and replicate the same, even with communication network issues.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
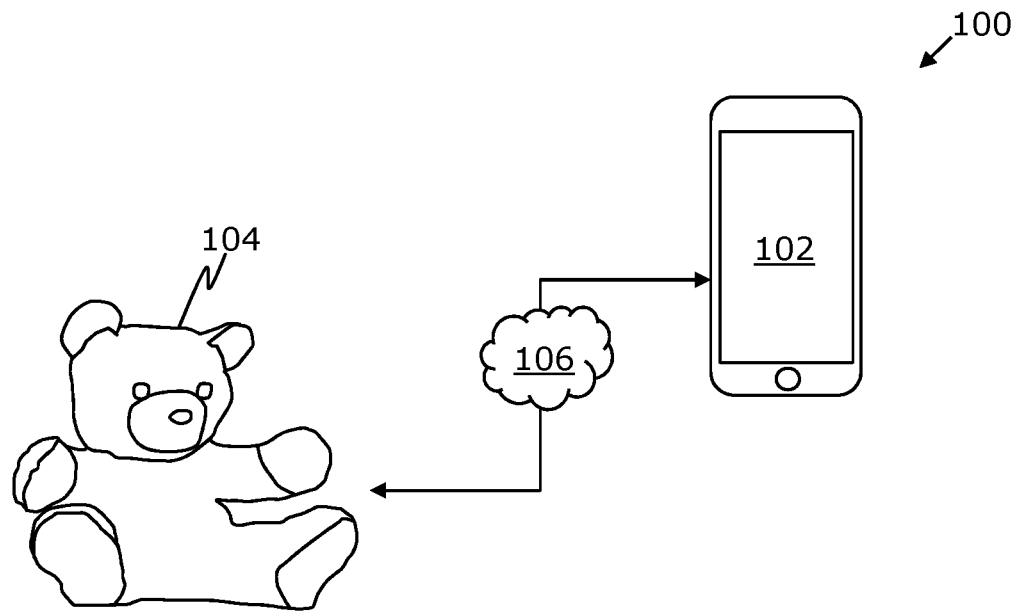
FIGS. 1 to 4 are schematic illustration of systems for providing remote touch, in accordance with various exemplary embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for providing remote touch of a first person to a second person, the system comprising a first device, a haptic terminal and a communication network, wherein the first device is associated with the first person, the first device comprises a first touch sensor configured to capture data related to a sliding movement of a pointer along the first touch sensor;

communication means for sending the captured data to the haptic terminal using the communication network;

the haptic terminal is associated with the second person, the haptic terminal comprises receiving means for receiving the captured data;

a processing unit configured to use the received captured data to form a control signal;

a touch replicator configured to replicate touch based on the control signal, wherein the replicated touch is a caress.

In another aspect, an embodiment of the present disclosure provides a method for providing remote touch of a first person to a second person, wherein the first person is associated with a first device and the second person is associated with a haptic terminal communicably coupled to the first device by a communication network, the method comprising capturing data related to a sliding movement of a pointer along a first touch sensor of the first device;

sending the captured data by communication means of the first device using the communication network;

receiving the captured data by receiving means of the haptic terminal;

forming a control signal, using the received captured data, by a processing unit of the haptic terminal; and replicating touch based on the control signal by a touch replicator of the haptic terminal, wherein the replicated touch is a caress.

The present disclosure provides the aforementioned system for providing remote touch of a first person to a second person and the aforementioned method for using the aforementioned system, which enables a reliable two-way communication in real-time and which includes touch sensation. The disclosed system is highly efficient in transferring touch over a distance while still creating the same feeling as a real human touch. The system simulates the touch by providing caress type of movement with a sufficient speed and pressure over a predefined area on the surface of the skin of a person, thereby effectively stimulating C-tactile fibres innervating the human skin. Moreover, the disclosed system maintains the feeling of the touch even in the absence of communication network. Such reliable persistence of touch is ensured by training the haptic terminal to learn on normally used movements to move the touch replicator along the surface of the skin of the person. Beneficially, the aforementioned system provides a new digital social communication enhancing the wellbeing of human lives. Additionally, the touch and/or remote touch inspires positive thinking, expands trust, reduces social anxiety and stress, boosts immune system and lowers blood pressure, and enhance the emotion of being connected.

Throughout the present disclosure, the term "touch" as used herein refers to a nice positive touch that provides a feeling of warmth and closeness of another person. In general, the touch, cutaneous or kinesthetic, is detected by C-tactile fibres innervating human skin and projected to the brain for perceiving the touch experience. Further, the term "remote touch" or "remote hug" as used throughout the present disclosure refers to a feeling of touch sent and received over a distance.

As mentioned herein above, the present disclosure provides the system for providing remote touch of the first person to the second person. The first person may be a person that wants to provide his or her touch, and the second person may be person who receives the touch from the first person. Additionally, in an embodiment, the second person may provide touch to the first person, or the first person and the second person may provide touch to each other.

Optionally, the first person may be a friend (for example young adult or university student), a romantic partner, a child, a parent, a grandparent, to the second person, which may be another friend (for example young adult or university student), another romantic partner, a parent, a child, a grandchild, respectively. In an embodiment, the first person and the second person may be associated with the medical fraternity, i.e. the first person may be a doctor, a nurse, a caretaker (such as a child, a parent, a grandparent, a friend or a relative), and the second person may be a patient or a person who needs care, such as an elderly person in an old age home, an Alzheimer's patient, a mis-treated person who is learning to re-like touch in a safe-environment, a prematurely born baby, and hospitalized parents or grandparents. Therefore, the system of the present disclosure enables in providing remote touch from the first person to the second person to enable relieving feeling of loneliness in the aforementioned group of people, for example, by promoting feeling of love, care and affection, promoting essential brain development in premature babies even when they are not in close contact with their parents, and catalyse audio-visual communication with Alzheimer's patients.

The system comprises the first device associated with the first person. In an example, the first device includes, but is not limited to, a smart phone, a laptop, a tablet computer, a palmtop, a touch-pad, a mobile media player and a personal digital assistant. Further, the first device may be a software-based device, i.e. may be operable using an application software. It will be appreciated that the application software running in the first device may enable in establishing communication between the first device and the second device. In other words, the application software may enable in sending the remote touch from the first person to the second person. In an example, in use the first person (or user) may provide an input to the first device through simple or multi-touch gestures over a display screen of the first device.

The first device comprises the first touch sensor configured to capture data related to a sliding movement of a pointer along the first touch sensor. In an embodiment, the touch sensor is arranged on a surface of the display screen of the first device, capable of detecting and locating a touch over the display screen. The first touch sensor typically has electric charges (such as electrical current or signal) which realign over the two-dimensional surface of the touch sensor whenever a touch gesture is provided thereon. The change in alignment of the electric charges is used to determine the position of each touch at that point on the touch sensor. According to an embodiment, the touch gesture may be provided by a sliding movement of a pointer, for example one or more fingers of the first person. Alternatively, the touch gesture may be provided to the first device by a stylus. Further, the touch gesture may be a continuous long stroke or small stokes provided by a finger or the stylus on the display screen.

Optionally, the first touch sensor is further configured to capture data related to pressure applied by the pointer along the first touch sensor. It will be appreciated that in order to read or capture data related to the touch gesture, the touch has to be provided onto the display screen of the first device with a certain amount of pressure. Further, based on the different intensities of the pressure applied on the display screen of the first device, the first touch sensor is configured to capture different data related thereto.

The first device comprises communication means for sending the captured data to the haptic terminal using the communication network. The term "communication means" used herein relates to a medium through which the first device and the haptic terminal communicate with each other. The communication network may be a wired or wireless communication network. Examples of the communication network may include, but are not limited to, a Wireless Fidelity (Wi-Fi) network, a Local Area Network (LAN), a wireless personal area network (WPAN), a wireless wide area network (WWAN), a cloud network, a Long Term Evolution (LTE) network, fifth generation (5G) network, or a 5G Evolved-Universal Terrestrial Radio Access-New Radio Dual connectivity (5G EN-DC) network, a plain old telephone service (POTS), a Metropolitan Area Network (MAN), and/or the Internet. The first device and the haptic terminal in the exemplary network environment may be configured to connect to the communication network, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

According to an embodiment, each of the first device and the haptic terminal may include a communication means. The communication means may include suitable logic, interfaces, and/or code configured to establish a communication with other communication circuits, via the communication network. For example, components of the communication means may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

According to an embodiment, the communication means in the first device is configured to send captured data to the haptic terminal using the communication network. The captured data comprises haptic information, such as a touch-based input, i.e. a touch gesture and pressure intensity associated with such touch gesture. The haptic information is captured when the first person operating the first device provides the touch-based input, and same is further communicated to the haptic terminal.

The haptic terminal is associated with the second person. The second person typically holds or wears the haptic terminal to receive the remote touch provided through the first device. The haptic terminal comprises receiving means for receiving the captured data. It will be appreciated that the receiving means includes the communication means, disclosed herein above.

In an embodiment, the haptic terminal may be configured or designed to have a shape of a toy, which may resemble an animal. For example, the haptic terminal may be a teddy bear, having a head portion and limbs (hands and legs) connected to a body portion. Further, the haptic terminal may be configured to resemble other animals, such as an elephant, a hippopotamus, a tiger and so forth. Alternatively, the haptic terminal may be configured have a shape of a toy resembling a human, such as a boy, a girl or an elderly person. Optionally, the haptic terminal is fabricated from fibre, cotton, wool, velvet or any other suitable material.

The haptic terminal comprises a processing unit configured to use the received captured data to form a control signal. The term "processing unit" as used herein, relates to a computational element that is operable to respond to and process instructions. The processing unit could be implemented as hardware, software, firmware or a combination of these. The processing unit is coupled to various components of the haptic terminal and is configured to control the operation of the haptic terminal.

Optionally, the haptic terminal may comprise an antenna, a transmitter-receiver device, an embedded software, an actuator, an actuator gear, an actuator motor, a battery arrangement, a power arrangement, cables, a printed circuit board (PCB), a pulse width modulation (PWM) system, power ON/OFF means, LED arrangement, which will be explained in greater detail herein later.

The term "control signal" as used herein, relates to a digital signal, which is generated by the processing unit based on the captured data received by the receiving means of the haptic terminal from the first device through the communication network. Further, the captured data is based on the touch-based input, i.e. the touch gesture and pressure intensity associated with such touch gesture. It will be appreciated that the control signal may vary based on different touch gestures and different pressure intensity associated with such touch gestures. For example, a touch gesture defined by a continuous long stroke applied with mild pressure, would result in generation of a control signal, which will be different from a control signal generated based on a touch gesture defined by multiple strokes applied with substantial pressure.

The haptic terminal comprises a touch replicator configured to replicate touch based on the control signal, wherein the replicated touch is a caress. The term "touch replicator" as used herein refers to a moving part of the haptic terminal responsible for providing the remote touch. In an example, the touch replicator may be a combination of mechanical elements and/or electrical or electronic components capable of providing movement to the moving part of the haptic terminal. In an example, the touch replicator may be a limb of the teddy bear, when the haptic terminal is configured to be teddy bear toy.

Optionally, the touch replicator comprises an arm having a first end and a second end, and a replicator surface having a size of X-Y mm$^2$ arranged on the first end of the arm. As described herein above, the touch replicator may be the limb of the teddy bear, therefore the touch replicator includes the arm having the first end and the second end, and the replicator surface, which may be a hand, arranged at the first end of the arm. Further, the second end of the arm may be coupled to the body portion of the haptic terminal.

According to an embodiment, the replicator surface, such as the hand, is a part of the haptic terminal which comes in contact with the second person while providing the remote touch. It will be apricated that a size of the replicator surface may play an important role in replicating the feeling or sensation in a remote touch to be real. For example, a too large size or a too small size of the replicator surface may deteriorate user's experience, i.e. the second person subjected to the remote touch. In Table 1. are collected feedback from experiments conducted with user groups to find out which replicator surface size (square millimetres) provides best sensation of a real remote touch.

TABLE 1

Results from focus group studies.

| Area (mm2) | User experience |
|---|---|
| 1 | really bad |
| 7 | bad |
| 13 | fair |
| 28 | good |
| 64 | extremely good |
| 113 | good |
| 177 | fair |
| 227 | bad |
| 314 | really bad |

According to an embodiment of the present disclosure, the replicator surface may include the size of 7-227 mm$^2$, or from 13 mm$^2$ up to 177 mm$^2$, preferably from 28 mm$^2$ up to 113 mm$^2$, and more preferably from 60 mm$^2$ up to 70 mm$^2$. For example, the size of the replicator surface may be 64 mm$^2$. Alternatively, the size of the replicator surface may be 110 mm$^2$. Further if the replicator surface formfactor is circular good or extremely good touch can be obtained with diameters between 6 mm to 12 mm.

Optionally, the touch replicator comprises at least one actuator configured to move the arm in respect to a pivot point, the pivot point arranged on the second end of the arm. In an example, the at least one actuator may include a motor, capable of rotating either in one or two directions (such as stepper motor). The touch replicator may also include gear arrangement and mechanical links operatively coupled to a shaft of the motor, for converting a rotary motion of the shaft of the motor to reciprocating motion of the touch replicator.

In an embodiment, the at least one actuator is configured to move the arm in two opposite directions. The two-dimensional direction includes opposite directions, such as an up and down movement or a left and right movement. Further, the movement of the arm is a laterally planar movement, i.e. along a plane, while moving along the two opposite directions.

Optionally as mentioned herein above, the second end of the arm is coupled to the body portion of the haptic terminal using the pivot point. The pivot point allows the touch replicator to have a multiple degree of freedom, i.e. multiple directions in which the touch replicator can move with respect to the body portion of the haptic terminal.

Optionally, the at least one actuator is further configured to move the arm in two additional directions to enable movement in a three-dimensional space. As mentioned herein above, the at least one actuator is configured to move the arm in two opposite directions. Therefore, if the two-dimensional direction includes opposite directions, such as left and right directions, then the two additional directions may be up and down direction. This would allow the arm to move in the three-dimensional space. In other words, the arm would not only be allowed to move in two directions and planar manner (such as along left and right directions only) but also allowed to follow two additional directions (up and down direction, while moving along left and right directions). The movement of the arm in three-dimensional space allows the arm to adjust its movement based on a surface configuration of an area upon which remote touch is to be provided. For example, the arm is allowed to follow the contour of a body portion, of the second person, that receives the remote touch to be provided the replicator surface.

As mentioned herein above, the replicated touch is a caress. The caress is a gentle or loving touch. The caress extends affection and closeness from the first person to the second person and enhances the fundamental emotional and social connectedness. Optionally, the caress is continuous long strokes or short strokes of hand. In another embodiment, the replicated touch may be other than a caress, such as a petting-movement (or a pat), a gentle pressing, a snuggle, a hug, holding hands, or a kiss.

Optionally, movement of the touch replicator follows a trajectory of the pointer along the first touch sensor with a determined relative speed. It will be appreciated that touch replicator replicates (or mirrors) a movement of the pointer along the first touch sensor for providing and replacing the remote touch. The determined relative speed is a speed of the sliding movement of the pointer along the first touch sensor, and the trajectory is a path followed by the pointer while moving along the first touch sensor (i.e. display screen of the first device). The determined relative speed may be slow, moderate or high based on the movement of the pointer (such as the finger of the first person), and the trajectory can be an arc, a line (of certain lengths) followed by the pointer. Therefore, based on the speed of the pointer's movement and the trajectory, the touch replicator may be allowed to follow a certain movement. For example, if the pointer moves along the first touch sensor with a speed 'A' for a certain distance or length 'B', the touch replicator moves for the length 'B' with the speed 'A'.

According to an embodiment, as described herein above, the haptic information or the touch-based input is associated with the touch gesture and pressure intensity associated with the touch gesture. It will be appreciated that the haptic information may also consider the trajectory and the relative speed associated with the pointer. Therefore, the control signal which is generated based on the haptic information (including the touch gesture, dynamics of the touch, the pressure intensity, the trajectory and the relative speed), and the appropriated size of the replicator surface enables in producing a concomitant touch for the second person. Dynamics of the touch refer to producing variations (speed, pressure, route) on the generated touch. The variations can originate from the first device or the variations for the dynamic touch can be alternatively added in the haptic device. Benefit of adding those in the haptic device is to take in account a situation if the resolution or capablities of the touch sensor of the first device is not sufficient to provide variations. According to additional embodiment material used in the respirator surface is selected to have a predetermined friction co-efficient. As an example the friction co-efficient can be similar as the friction co-efficient of a skin of a person.

Optionally, the processing unit is further configured to use the received captured data to learn a first touch pattern emanating from the first person when in use. It will be appreciated that the first touch pattern may be generated based on the haptic information or input provided by the first person through the first device. For example, the first touch pattern may be based on the touch gesture, the pressure intensity, the trajectory and the relative speed of the pointer along the first touch sensor. Therefore, the first touch pattern may include specific data, associated with the touch gesture, the pressure intensity, the trajectory and the relative speed. Furthermore, the specific data associated with the first touch pattern has to be similar and repetitive in nature. It will be appreciated that any change or deviation in the touch gesture, the pressure intensity, the trajectory and the relative speed would result in another touch pattern. The learning can refer to using statistical methods, repeating movements done during last usage session(s), feeding the touch pattern to machine learning teaching module, feeding the touch pattern to artificial learning module to teach a neural network (such as recurrent neural network, convolutional neural network etc). Trained neural network can be used when repeating movements autonomously if needed.

In an embodiment, the haptic terminal comprises a memory element operable to store the first touch pattern of the first person. The memory element may be a local data storage element, such as a memory chip. Alternatively, the memory element may be associated with an external database, such as a cloud storage. Therefore, the stored first touch pattern may be retrieved, upon successful authentication of the identification of the first person and the second person, from the memory element. It will be appreciated that the memory element may be further operable to contain or store software programs or codes for use by or in connection with the first device and/or the haptic terminal.

Optionally, the first touch pattern comprises a start phase, an active phase and an end phase. The first touch pattern typically corresponds to a touch of the pointer on the first touch sensor, followed by a steady movement of the pointer along the first touch sensor for a certain time period, and removal of the pointer from the first touch sensor. Therefore, the start phase of the first touch pattern corresponds to the touch of the pointer with the first touch sensor, which may activate the touch replicator. The active phase corresponds to the steady movement of the pointer along the first touch sensor for a certain time period, which may allow the touch replicator to move for the certain time period. The end phase corresponds to the removal of the pointer from the first touch sensor, which may stop the movement of the touch replicator. The start phase with respect to a time frame may be for a fraction of seconds, followed by the active phase that may be for a couple of seconds or minutes, and the end phase may also be for a fraction of seconds.

According to an embodiment, the haptic terminal is further configured to use the learned first touch pattern to control the touch replicator if the communication network is unavailable. In case of communication network issues, like break in communication network or poor signal strength, the processing unit of the haptic terminal is operable to retrieve the stored first touch pattern and control the movement of the touch replicator based on the stored first touch pattern. This allows continuity in providing remote touch by the haptic terminal even with communication network issues, and thereby enhancing user's (i.e. the second person's) experience of the remote touch.

Optionally, the haptic terminal is configured to use the active phase during a communication break for a first determined time and configured to change to the end phase after lapse of the first determined time. As mentioned earlier, the active phase corresponds to the steady movement of the pointer along the first touch sensor for the certain time period, which may allow the touch replicator to move for the certain time period. Therefore, during the communication break for the first determined time (which may be for a couple of seconds to a couple of minutes), the processing unit of the haptic terminal is operable to retrieve the stored first touch pattern and initiate the active phase of the first touch pattern for the certain time period. It will be appreciated that the certain time period of the active phase of the first touch pattern would correspond to the first determined time (for which there is break in the communication network). Accordingly, during the communication break, for the first determined time, the touch replicator of the haptic terminal follows the stored first touch pattern to maintain the continuity of the remote touch.

According to another embodiment of the present disclosure, the system for providing remote touch of the first person to the second person may include a pair of haptic terminals (instead of the first device and the haptic terminal). It will be appreciated, in such instance, each of the first person and the second person is associated with one haptic terminal of the pair of haptic terminals. Specifically, the haptic terminal, associated with the first person, functions as the first device (as described herein above). For example, the haptic terminal may include a touch sensor (such as the first touch sensor of the first device) configured to capture data related to a sliding movement of a pointer along the touch sensor. The haptic terminal may also include a communication means for sending the captured data to the haptic terminal using the communication network. Accordingly, the haptic terminal associated with the second person receives the captured data, processes the received captured data to form a control signal, and replicates the remote touch (to be provided by the first person to the second person) by the touch replicator of the haptic terminal (associated with the second person). It will be appreciated that the haptic terminal, associated with the first person, is also operable to provide a remote touch (of the second person to the first person) by the touch replicator of the haptic terminal (associated with the first person).

According to yet another embodiment, the system for providing remote touch comprises the first device associated with the first person, and a second device (similar to the first device) associated with the second person. The system further comprise the haptic terminal associated with the second person, and an additional haptic terminal associated with the first person that is similar to the haptic terminal associated with the second person. Further, the first device, the second device, and the two haptic terminals are communicably coupled to each other by the communication network.

According to still another embodiment, the system for providing remote touch comprises the first device associated with the first person, the haptic terminal associated with the second person, and a third device, which may be associated with the first person. In an example, the third device may be a wearable device, such as a wrist band, a smart watch, a locket and the like; or a hand-held device, such as a stuffed glove or a toy, an entity such as a soft ball, a pillow, and the like. The third device is operable to provide sensation or feeling of a remote touch (from the second person to the first person) by means of vibration. Additionally, the third device may be operable to enhance the feeling of the remote touch by means of an audio signal, a visual signal or any combination thereof. The first device, the haptic terminal and the third device are communicably coupled to each other by the communication network.

The present disclosure also relates to the method as described above. Various embodiments and variants disclosed above apply mutatis mutandis to the method.

Optionally, the method further comprises learning a first touch pattern, emanating from the first person, using the received captured data by the processing unit.

Optionally, the method further comprises controlling the touch replicator of the haptic terminal, when the communication network is unavailable, by using the learned first touch pattern, the first touch pattern comprising a start phase, an active phase and an end phase.

Optionally, in the method, the active phase is used by the haptic terminal during a communication break for a first determined time and changed to the end phase after lapse of the first determined time.

Optionally, in the method, the touch replicator comprises an arm having a first end and a second end, and a replicator surface having a size of X-Y mm² arranged on the first end of the arm.

Optionally, in the method, the touch replicator comprises at least one actuator configured to move the arm in respect to a pivot point, the pivot point arranged on the second end of the arm.

Optionally, the method further comprises moving an arm of the touch replicator in two opposite directions by at least one actuator of the touch replicator.

Optionally, in the method, movement of the touch replicator follows a trajectory of the pointer along the first touch sensor with a determined relative speed.

Optionally, the method further comprises capturing data related to pressure applied by the pointer along the first touch sensor.

Optionally, the method further comprises moving the arm, by the at least one actuator, in two additional directions to enable movement in a three-dimensional space.

According to an exemplary implementation of embodiment(s) of the present disclosure, to initiate the task of providing the remote touch includes establishing a communication between the first person and the second person. It will be appreciated that based on various embodiments of the system, which may include at least one first device, at least one haptic terminal and/or the third device; the first person and the second person may have different types of communication network established therebetween.

According to an embodiment, the process of providing remote touch from the first person to the second person is as follows.

A) Communication establishment: the basic communication between the first person and the second person is established by means of an application software and communication means. The application software may run on the first device, which enables the first person to contact the second person by way of calling or providing an audio signal, a visual signal or a vibration alert. In order to access the application software and subsequently initiating a communication, an account is required to be made for accessing the application software. The account for the application software requires entering personal details, email address, phone number (essentially a working mobile number), and a password for security reasons. After a successful sign in to the application software, the first device is used to initiate the communication, using the communication network, to connect with the haptic terminal, which should be essentially in a power-ON mode. The haptic terminal receives a communication request from the first device, which is accepted by the second person.

B) Providing touch input: once the second person has accepted the communication request from the first person and holds the haptic terminal, the first person may provide touch by sliding movement of a pointer along a first touch sensor of the first device (which may be a haptic terminal). The first touch sensor of the first device captures the data related to the sliding movement of the pointer along the first touch sensor. Thereafter, the captured data is sent by the communication means of the first device to the haptic terminal using the communication network.

C) Replicating touch: the captured data is received by the haptic terminal to form a control signal understandable by the haptic terminal. The touch replicator replicates the remote touch (as caress) based on the control signal and provides to the second person.

DETAILED DESCRIPTION OF THE DRAWINGS

Referring to FIGS. 1 to 4, illustrated are schematic illustration of systems 100, 200, 300 and 400 for providing remote touch of a first person (not shown) to a second person (not shown), in accordance with various exemplary embodiments of the present disclosure. As shown in FIG. 1, the system 100 for providing remote touch includes a first device 102, which may be associated with the first person. The system 100 further includes a haptic terminal 104, which may be associated with the second person. The haptic terminal 104 is communicably coupled to the first device 102 by a communication network 106.

Figure 2:
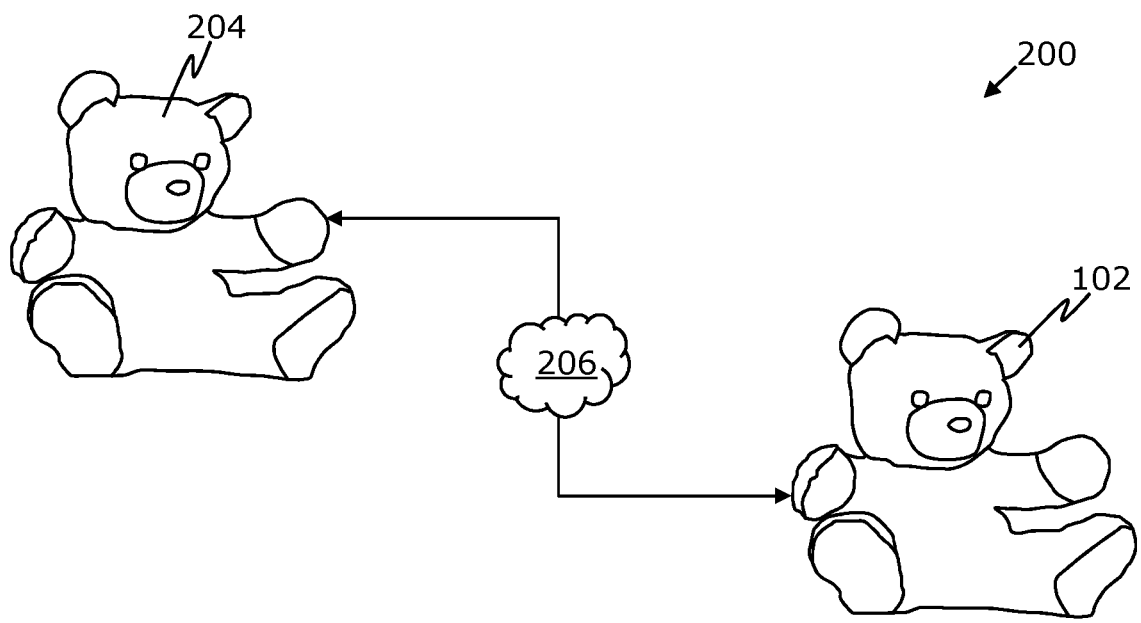

Referring to FIG. 2, the system 200 for providing remote touch includes a first device 202, which is a haptic terminal, may be associated with the first person. The system 200 further includes a haptic terminal 204, which may be associated with the second person. The haptic terminal 204 is communicably coupled to the first device 202 by a communication network 206.

Figure 3:
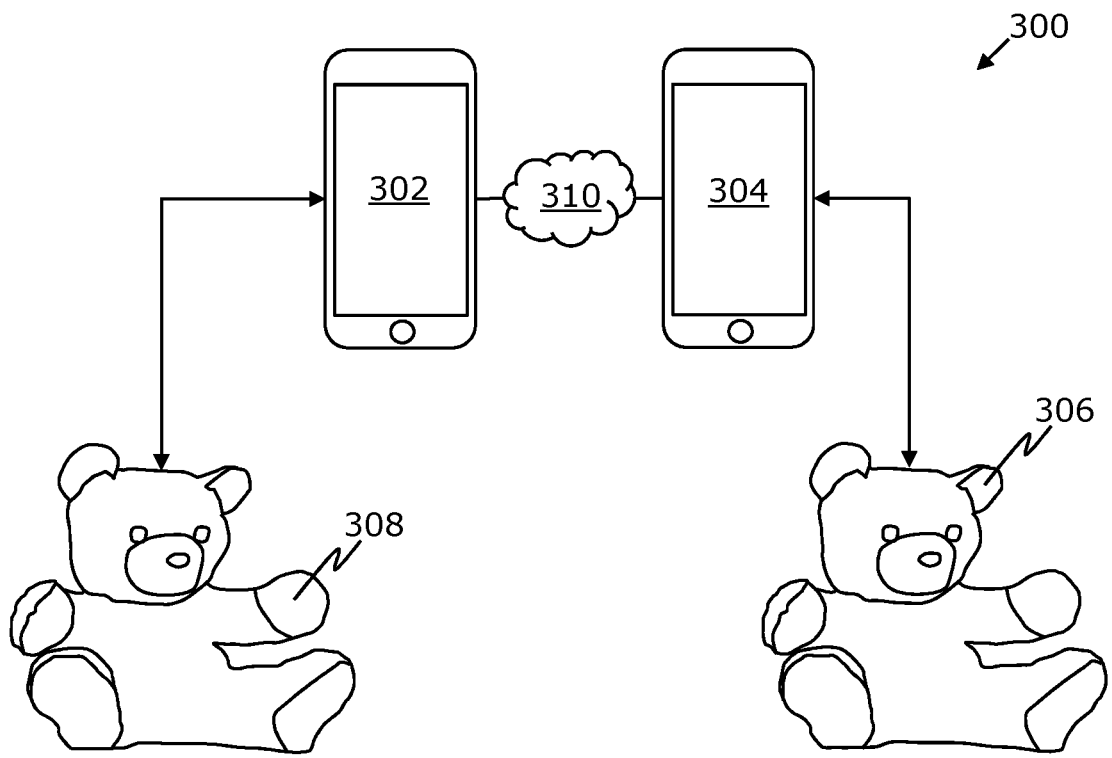

Referring to FIG. 3, the system 300 for providing remote touch includes a first device 302, which may be associated with the first person. The system 300 also includes a second device 304, which may be associated with the second person. The system 300 further includes a haptic terminal 306, which may be associated with the second person; and an additional haptic terminal 308, which may be associated with the first person. The first device 302, the second device 304, and the haptic terminals 306, 308 are communicably coupled to each other by a communication network 310.

Figure 4:
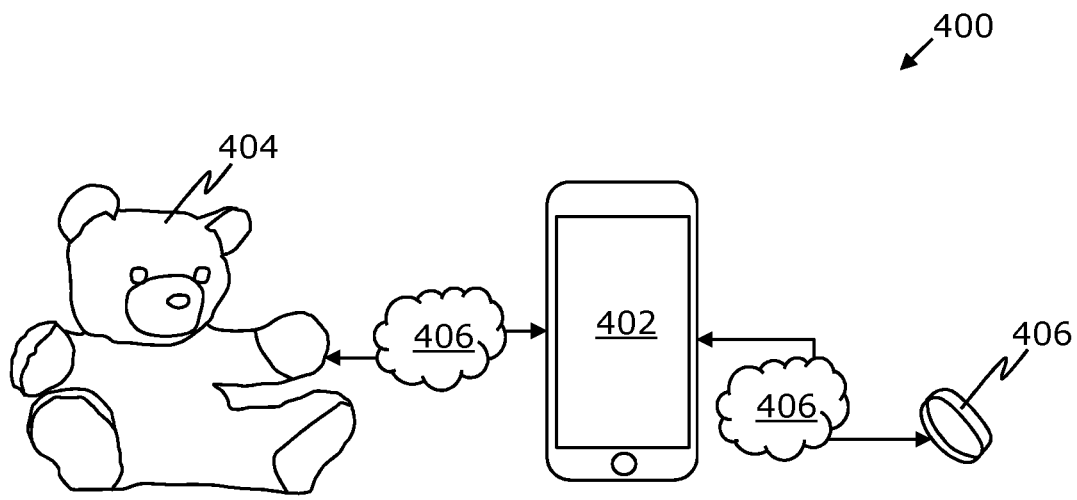

Referring to FIG. 4, the system 400 for providing remote touch includes a first device 402, which may be associated with the first person. The system 400 further includes a haptic terminal 404, which may be associated with the second person. As shown, the system 400 also includes a third device 406, which may be associated with the first person. The first device 402, the haptic terminal 404 and the third device 406 are communicably coupled to each other by a communication network 408.

Figure 5:
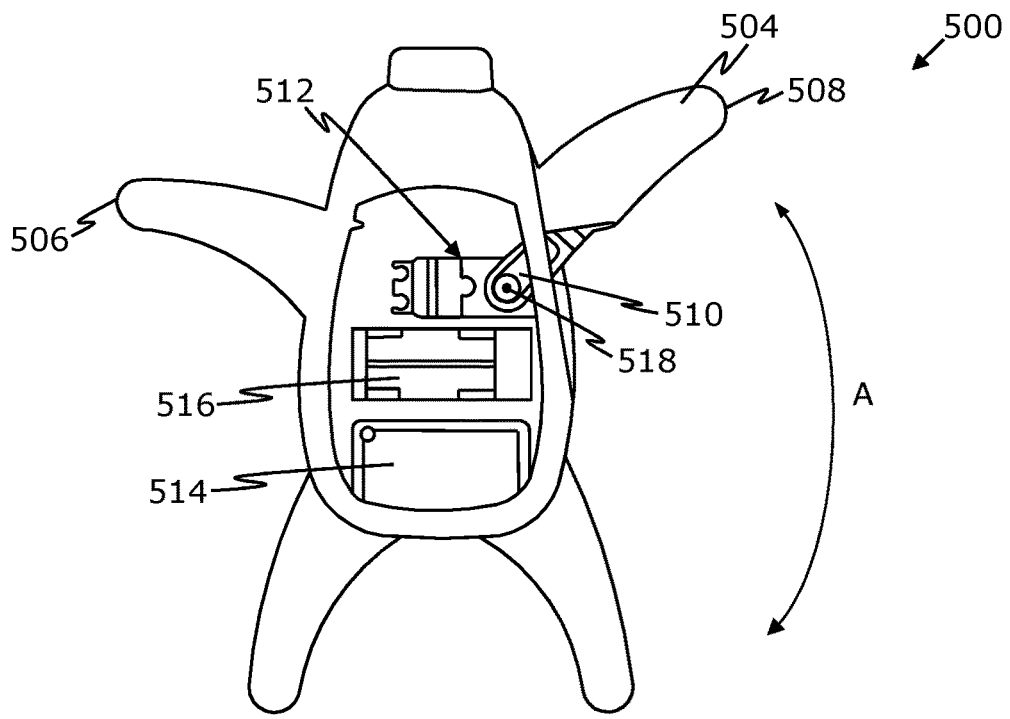
FIG. 5 is schematic illustrations of a haptic terminal, in accordance with an embodiment of the present disclosure.

Referring to FIG. 5, illustrated is schematic illustrations of a haptic terminal 500, in accordance with an embodiment of the present disclosure. As shown, the haptic terminal is in shape of a teddy bear and comprises arms 504 and 506. The arm 504 is configured to move in order to replicate a remote touch. The arm 504 comprises a first end 508 and a second end 510. The haptic terminal further comprises an actuator 512, a processing unit 514 and a battery arrangement 516. The actuator 512 is configured to move the arm 504 in respect to a pivot point 518. The pivot point 518 is arranged on the second end 510 of the arm 504. More optionally, the actuator 512 is configured to move the arm 504 in two opposite directions. As shown, the actuator 512 enables the arm 504 to move in a laterally upward and downward directions shown with an arrow 'A'. Also, the arm 504 is also configured to move in two additional directions to enable movement in a three-dimensional space to conform to body anatomy of the second person.

Figure 6:
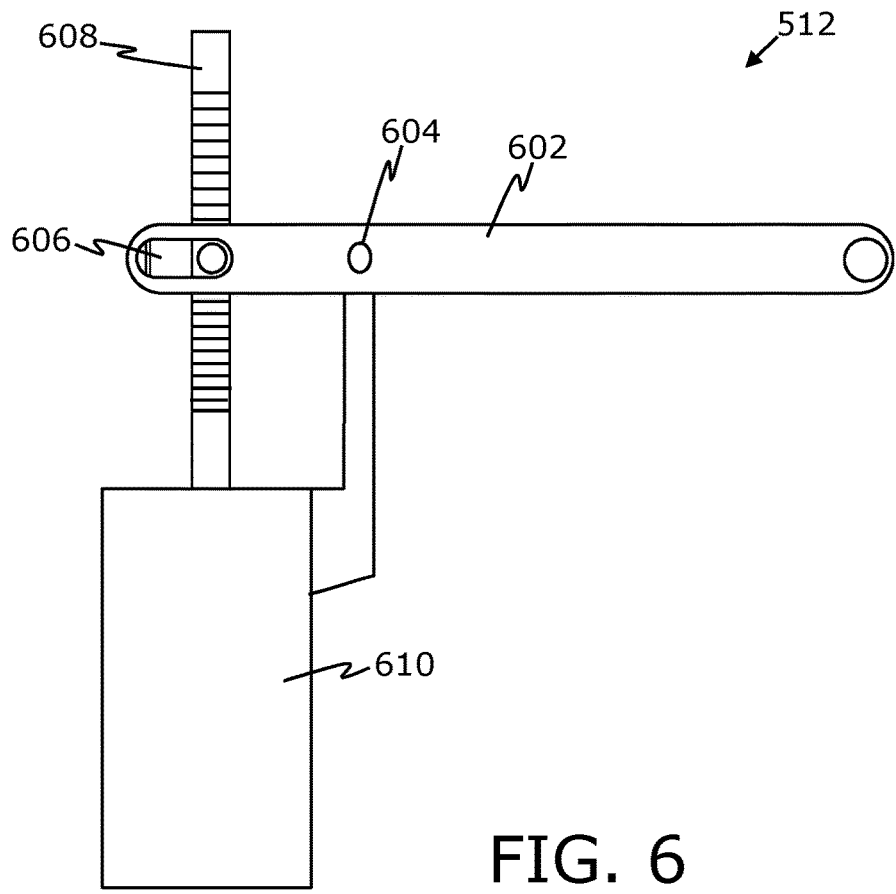
FIG. 6 is a schematic illustration of an actuator, in accordance with an embodiment of the present disclosure.

Referring to FIG. 6, shown is a schematic illustration of the actuator 512, in accordance with an embodiment of the present disclosure. The actuator 512 includes a linear member 602 (which primarily act as an arm, such arm 504 shown in FIG. 5) hinged at a pivot point 604. Moreover, the linear member 602 is coupled to a ball screw 606, coupled to a threaded rod 608. The actuator 600 further includes a motor 610 (for example a stepper motor) to provide an oscillatory movement to the threaded rod 608. The oscillatory movement of the threaded rod 608 enables a linear movement of the ball screw 606, resulting in angular movement of the linear member 602. Furthermore, the ball screw 606 is also configured to enable a planar movement of the linear member 602.

Figure 7A:
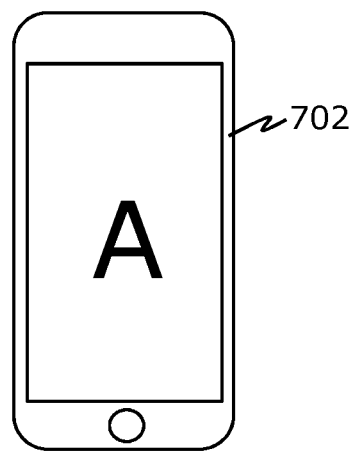
FIGS. 7A-F are schematic illustrations of various operational stages related to providing remote touch from a first person to a second, in accordance with an embodiment of the present disclosure.
Figure 7B:
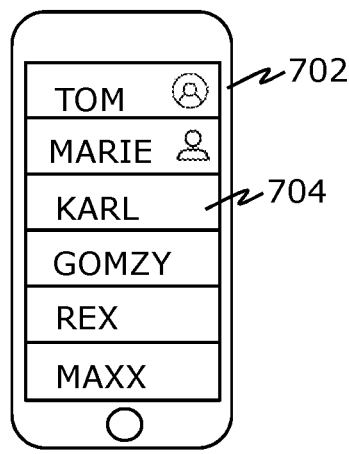
Figure 7C:
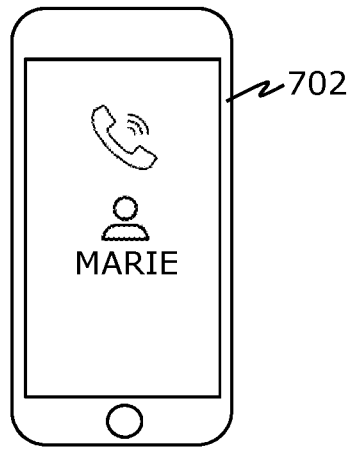
Figure 7D:
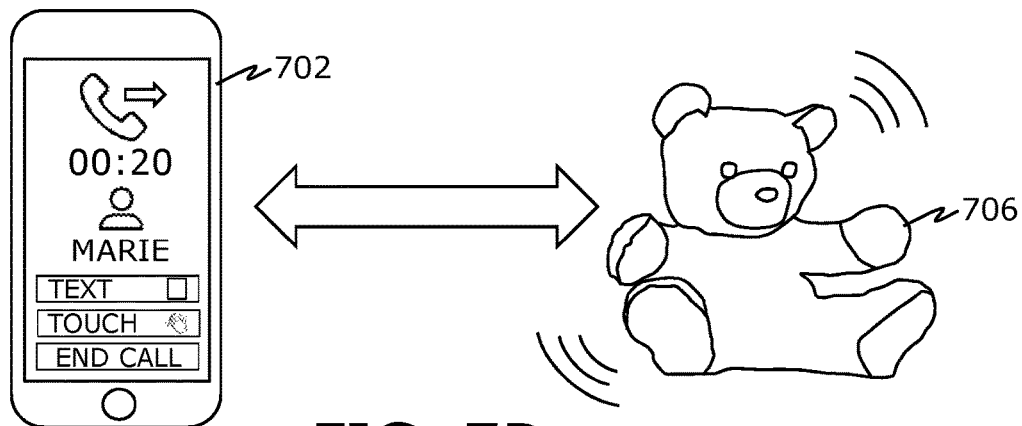
Figure 7E:
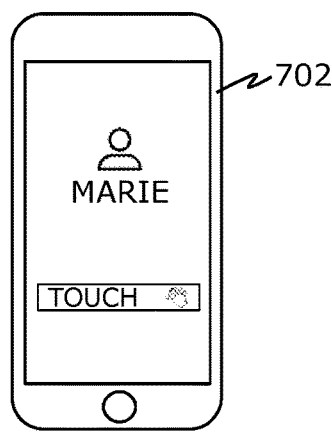
Figure 7F:
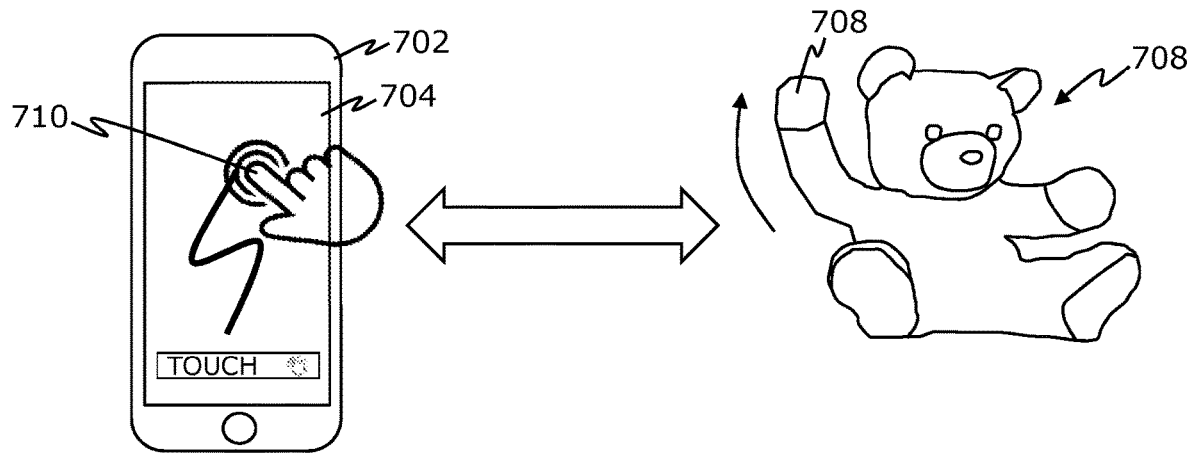

Referring to figs' 7, shown are various operational stages related to providing remote touch from a first person to a second person, in accordance with an embodiment of the present disclosure. With reference to FIG. 7A, shown is an application software "A" running on the first device 702. With reference to FIG. 7B, displayed is a contact list of the first device 702 on the user interface 704 of the first device 702. With reference to FIG. 7C, shown is selection of a contact "MARIE" from the contact list as the second person and establishing a communication with the second person. As shown, the communication is established by means of on audio-based calling. With reference to FIG. 7D, shown is a successful connection between the first device 702 and the haptic terminal 706. Furthermore, shown are other options, such as "TEXT" and "TOUCH" based communication and "END CALL" to end the call. With reference to FIG. 7E, shown is selection of the "TOUCH" based communication option on the first device 702 for initiating a remote touch from the first person to the second person. With reference to FIG. 7F, shown is the movement of the arm 708 of the haptic terminal 706 in response to the sliding movement of a pointer 710 along the user interface (or first touch sensor) 704 of the first device 702.

Figure 8:
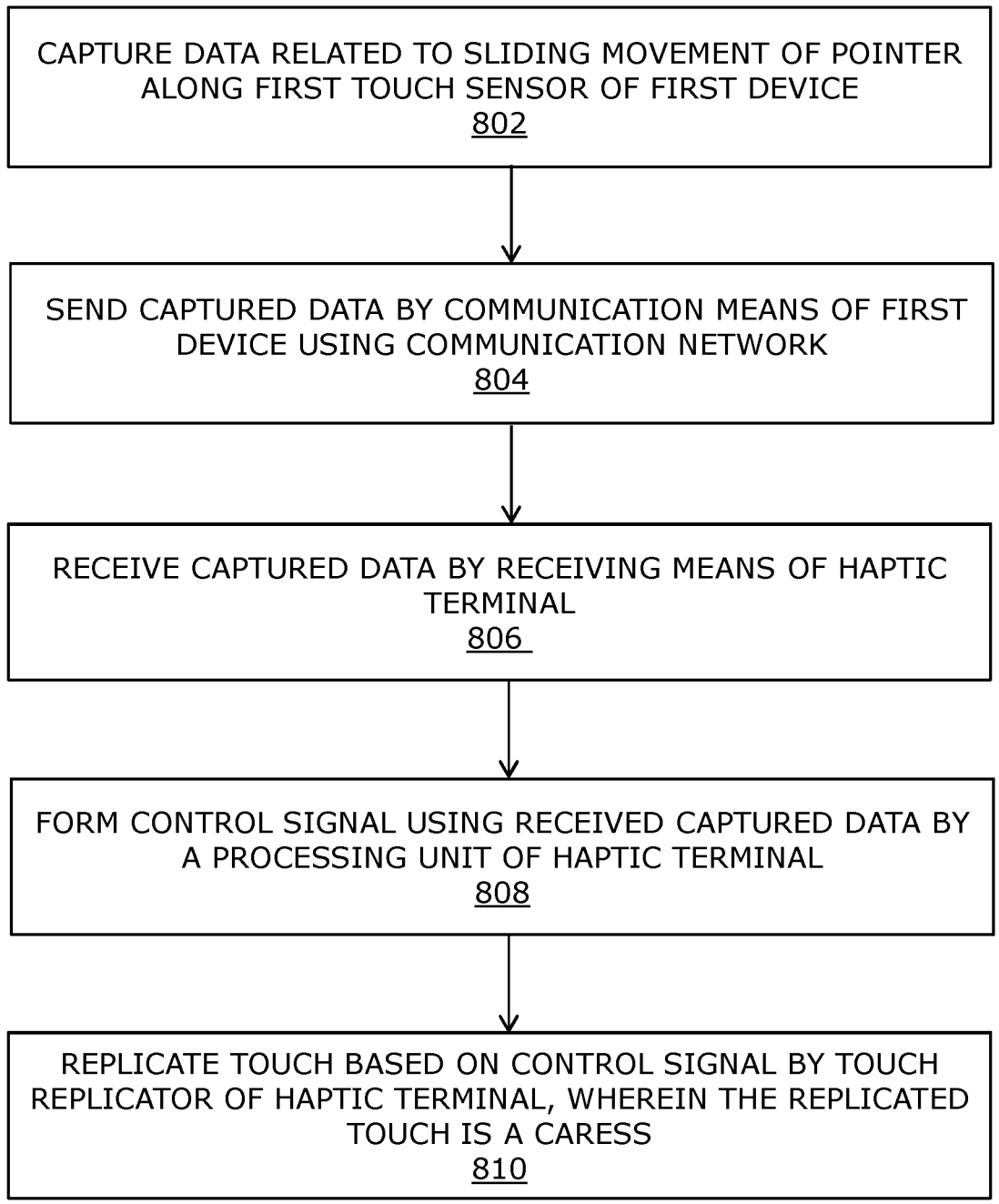
FIG. 8 is an illustration of steps of a method for providing remote touch from the first person to the second person, in accordance with an embodiment of the present disclosure.

Referring to FIG. 8, shown is illustration of steps of a method for providing remote touch from the first person to the second person, in accordance with an embodiment of the present disclosure. At step 802, the data related to a sliding movement of a pointer along a first touch sensor of the first device is captured. At step 804, the captured data is sent by communication means of the first device using the communication network. At step 806, the captured data is received by receiving means of the haptic terminal. At step 808, a control signal is formed, using the received captured data, by a processing unit of the haptic terminal. At step 810, touch is replicated based on the control signal by a touch replicator of the haptic terminal, wherein the replicated touch is a caress. The steps 802, 804, 806, 808 and 810 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for providing remote touch of a first person to a second person, the system comprising a first device, a haptic terminal and a communication network, wherein
   the first device is associated with the first person, the first device comprises
      a first touch sensor configured to capture data related to a sliding movement of a pointer along the first touch sensor;
      communication means for sending the captured data to the haptic terminal using the communication network;
   the haptic terminal is associated with the second person, the haptic terminal comprises
   receiving means for receiving the captured data;
   a processing unit configured to use the received captured data to form a control signal; and
   a touch replicator configured to replicate touch based on the control signal, wherein the replicated touch is a caress;
   wherein the processing unit is further configured to use the received captured data to learn a first touch pattern emanating from the first person when in use; and
   wherein the haptic terminal is further configured to use the learned first touch pattern to control the touch replicator if the communication network is unavailable.

2. The system according to claim 1, wherein the first touch pattern comprises a start phase, an active phase and an end phase.

3. The system according to claim 2, wherein the haptic terminal is configured to use the active phase during a communication break for a first determined time and configured to change to the end phase after lapse of the first determined time.

4. The system according to claim 1, wherein the touch replicator comprises an arm having a first end and a second end, and a replicator surface having a size of 7-227 mm$^2$ arranged on the first end of the arm.

5. The system according to claim 4, wherein the touch replicator comprises at least one actuator configured to move the arm in respect to a pivot point, the pivot point arranged on the second end of the arm.

6. The system according to claim 5, wherein the at least one actuator is configured to move the arm in two opposite directions.

7. The system according to claim 1, wherein movement of the touch replicator follows a trajectory of the pointer along the first touch sensor with a determined relative speed.

8. The system according to claim 1, wherein the first touch sensor is further configured to capture data related to pressure applied by the pointer along the first touch sensor.

9. The system according to claim 6, wherein the at least one actuator is further configured to move the arm in two additional directions to enable movement in a three-dimensional space.

10. A method for providing remote touch of a first person to a second person, wherein the first person is associated with a first device and the second person is associated with a haptic terminal communicably coupled to the first device by a communication network, the method comprising:
    capturing data related to a sliding movement of a pointer along a first touch sensor of the first device;
    sending the captured data by communication means of the first device using the communication network;
    receiving the captured data by receiving means of the haptic terminal;
    forming a control signal, using the received captured data, by a processing unit of the haptic terminal;
    replicating touch based on the control signal by a touch replicator of the haptic terminal, wherein the replicated touch is a caress;
    learning a first touch pattern, emanating from the first person, using the received captured data by the processing unit; and
    controlling the touch replicator of the haptic terminal, when the communication network is unavailable, by using the learned first touch pattern, the first touch pattern comprising a start phase, an active phase and an end phase.

11. The method according to claim 10, wherein the active phase is used by the haptic terminal during a communication break for a first determined time, and changed to the end phase after lapse of the first determined time.

12. The method according to claim 10, further comprising moving an arm of the touch replicator in two opposite directions by at least one actuator of the touch replicator.

13. The method according to claim 10, wherein movement of the touch replicator follows a trajectory of the pointer along the first touch sensor with a determined relative speed.

14. The method according to claim 10, further comprising capturing data related to pressure applied by the pointer along the first touch sensor.

15. The method according to claim 12, further comprising moving the arm, by the at least one actuator, in two additional directions to enable movement in a three-dimensional space.

* * * * *